J. V. MUNGER.
UNIVERSAL DRIVING JOINT.
APPLICATION FILED JUNE 28, 1917.
1,305,302.
Patented June 3, 1919.
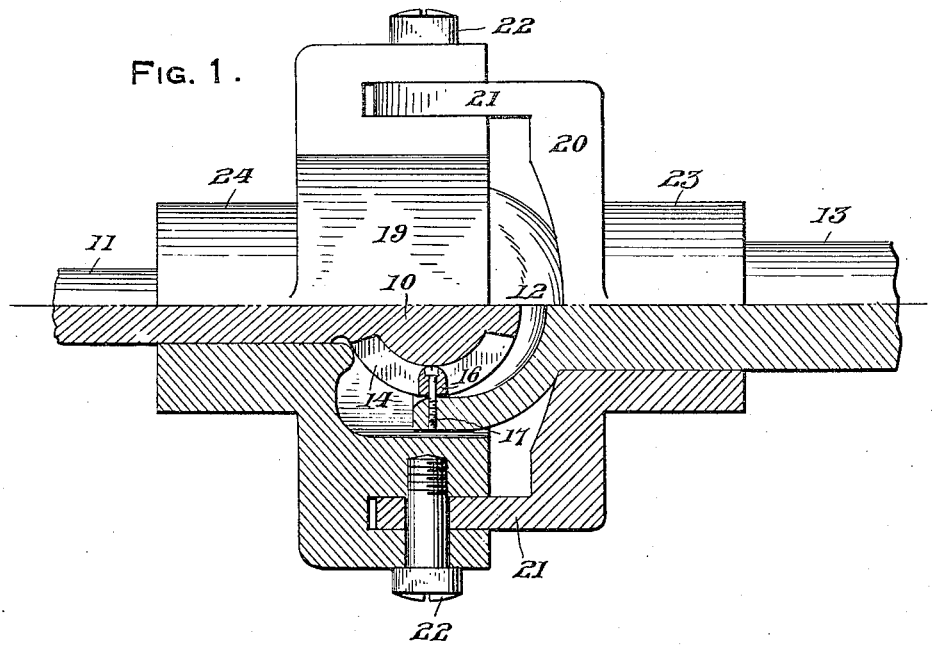
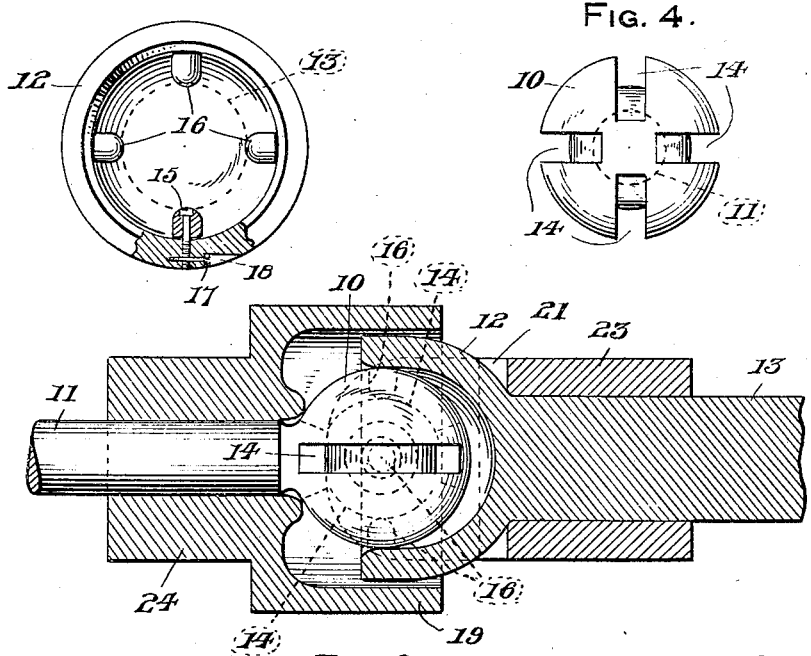
Inventor
J. V. Munger

UNITED STATES PATENT OFFICE.

JAMES V. MUNGER, OF PORTLAND, NEW YORK.

UNIVERSAL DRIVING-JOINT.

1,305,302.  Specification of Letters Patent.  Patented June 3, 1919.

Application filed June 28, 1917. Serial No. 177,478.

*To all whom it may concern:*

Be it known that I, JAMES V. MUNGER, a citizen of the United States, residing at Portland, in the county of Chautauqua and State of New York, have invented certain new and useful Improvements in Universal Driving-Joints, of which the following is a specification.

This invention relates to new and useful improvements in universal driving joints.

The primary object of the invention is the provision of a universal joint especially adaptable for front wheel drives for automobiles, the same however being serviceable in any connection where a universal joint is desirable.

A further object of the invention is the provision of a universal joint capable of permitting a turning of the connected shafts through a large angle, anti-friction means being employed in the construction of the joints greatly reducing the friction incident to operation.

A still further object of the device is to provide a universal joint that is easy and inexpensive to manufacture and one that possesses great strength, the same being capable of perfect operation at any angle at which the same is capable of turning, such for instance as when employed as the driving shaft for any of the steering wheels of the vehicle.

In the drawings forming a part of this application and in which like characters refer to corresponding parts throughout the several views.

Figure 1 is a view partially in elevation and partly in central longitudinal section of the present device.

Fig. 2 is a central, longitudinal, sectional view of the device, the ball member being shown in elevation.

Fig. 3 is an interior, end view of the socket member of the device partially broken away, and Fig. 4 is an end view of the ball member of the device.

Referring more in detail to the drawings it will be first understood that the device is in the nature of a universal joint, being of the ball and socket variety, the construction being so arranged that the bearings are all always in operative engagement with the ball regardless of the position which the ball may assume relatively of the socket within which the ball is contained.

Broadly considered, the device consists of a head or ball member 10, rigidly carried by one shaft such as 11, adapted for shiftable reception within a one-piece cup-shaped or hemispherical socket member 12, rigid upon the adjacent end of a larger shaft 13. The ball 10 is provided with equally spaced slots 14, arranged in the plane of the longitudinal axis of the shaft 11, while inwardly projecting pins 15, carried within the socket 12, adjacent the open end of the latter are provided with rollers 16, adapted for rotation on the pins and for sliding reception in the slots 14.

The pins 15, may be of any desired form for the convenient mounting of the rollers 16 within the socket 12, and are herein illustrated in the form of screws threaded through the sides of the socket 12, and retained by locking screws 17, fitting within recesses 18, in the outer face of the socket 12.

The ball and socket members 10 and 12 respectively, when assembled, are adapted for retention in their operative positions by means of any suitable housing or casing capable of turning with the joint. A receiving housing 19 is herein shown in the form of a cap-shaped socket for this purpose and within which the ball and socket members unitedly are arranged, while a retaining means or yoke 20, is provided with arms 21, hinged to the member 19 at diametrically opposite points by means of the screws 22, it being understood that the shaft 13, extends through a boss or collar 23, of the yoke member 20, while the shaft 11 extends through a similar boss or collar 24, projecting centrally from the housing or socket 19.

The complete operation of the device will be at once apparent from this detailed description thereof, it being seen that either of the shafts 11 or 13 may be freely revolved for rotating the companion shaft coupled thereto, while an equally perfect operation is accomplished when the shafts 11 and 13 are positioned at an angle with respect to each other.

The rollers 16 being substantially hemispherical and positioned within the slots 14, provide a ball and socket joint in the nature of a roller bearing having very little friction, and, as the pins 15 are set at points of the largest internal diameter of the socket 12 and also about the greatest circumference of the ball, the slots of the ball and the rollers on the pins of the socket 12 are always in operative connection at whatever angle the ball member 10 and socket member 12 may be relative to each other. The pin-carried rollers 16, will never leave the ball slots 14, even after the roller at one side of the socket has passed the central vertical axis of the ball 10.

While the form of the invention herein shown and described is believed to be preferable, it is understood that minor changes may be made therein without departing from the spirit and scope of the invention as claimed.

What I claim as new is:

A universal joint comprising a shaft having a substantially hemispherical socket member rigid on one end thereof, said socket member being provided with recesses in the outer face thereof, radial inwardly projecting screws threaded through the sides of said socket member adjacent the open end of the latter, locking screws within said recesses to retain the inwardly projecting screws in position, anti-friction rollers journaled upon said inwardly projecting screws within the socket member, and a second shaft having a ball member rigid upon one end thereof, said ball member being positioned within said socket and provided with peripheral slots receiving said rollers, said slots being arranged in planes longitudinally of said second shaft.

In testimony whereof I affix my signature.

JAMES V. MUNGER.